(12) United States Patent
Jessberger

(10) Patent No.: US 7,481,196 B2
(45) Date of Patent: Jan. 27, 2009

(54) OIL PAN USEFUL FOR AN INTERNAL COMBUSTION ENGINE

(75) Inventor: Thomas Jessberger, Asperg (DE)

(73) Assignee: Mann & Hummel GmbH, Ludwigsburg (DE)

( * ) Notice: Subject to any disclaimer, the term of this patent is extended or adjusted under 35 U.S.C. 154(b) by 238 days.

(21) Appl. No.: 11/449,617

(22) Filed: Jun. 9, 2006

(65) Prior Publication Data

US 2006/0278099 A1 Dec. 14, 2006

(30) Foreign Application Priority Data

Jun. 9, 2005 (DE) ................. 20 2005 009 096 U

(51) Int. Cl.
*F02B 77/00* (2006.01)
(52) U.S. Cl. .................. 123/195 C; 123/198 E
(58) Field of Classification Search ............ 123/195 C, 123/90.38, 195 R, 195 H, 198 E; 184/106
See application file for complete search history.

(56) References Cited

U.S. PATENT DOCUMENTS

| | | | | |
|---|---|---|---|---|
| 3,678,914 A | * | 7/1972 | Vulliamy ................. | 123/195 C |
| 4,114,714 A | | 9/1978 | Fachbach et al. | |
| 4,296,716 A | * | 10/1981 | Hofbauer et al. ......... | 123/195 C |
| 4,395,982 A | * | 8/1983 | Moller ................... | 123/195 C |
| 5,452,693 A | * | 9/1995 | Clark .................... | 123/195 C |
| 5,465,692 A | * | 11/1995 | Uraki et al. ............ | 123/195 C |
| 5,531,196 A | * | 7/1996 | Clark .................... | 123/195 C |
| 5,632,543 A | * | 5/1997 | McGrath et al. ........... | 312/406 |
| 5,633,067 A | * | 5/1997 | Illbruck et al. ............ | 428/138 |
| 5,636,759 A | * | 6/1997 | Brummer .................. | 220/212 |
| 6,027,384 A | * | 2/2000 | Nitta et al. .............. | 440/75 |
| 6,131,543 A | * | 10/2000 | Achenbach et al. ..... | 123/195 C |
| 6,155,226 A | * | 12/2000 | Ozawa et al. ........... | 123/195 C |
| 6,371,073 B1 | * | 4/2002 | Billimack et al. ....... | 123/195 C |
| 6,415,757 B1 | * | 7/2002 | Glovatsky ............... | 123/195 C |
| 6,550,440 B1 | * | 4/2003 | Vrsek et al. ............ | 123/184.61 |
| 6,584,950 B1 | * | 7/2003 | Cunningham ........... | 123/195 C |
| 6,705,270 B1 | * | 3/2004 | Rau et al. ............... | 123/195 C |
| 2003/0029412 A1 | * | 2/2003 | Kato et al. .............. | 123/195 C |
| 2004/0154576 A1 | * | 8/2004 | Kamiyama et al. ...... | 123/195 C |
| 2004/0177826 A1 | * | 9/2004 | Duwel .................... | 123/196 R |
| 2004/0198110 A1 | * | 10/2004 | Sumigawa et al. ........ | 440/88 L |

(Continued)

FOREIGN PATENT DOCUMENTS

DE 31 42 327 A1 5/1983

(Continued)

OTHER PUBLICATIONS

Austrian Search Report Dated Apr. 28, 2006 (Three (3) Pages).

*Primary Examiner*—Noah Kamen
(74) *Attorney, Agent, or Firm*—Crowell & Moring LLP

(57) ABSTRACT

An oil pan, particularly for an internal combustion engine, having a protective contour member with a protective shell that is spaced apart from the outer wall of the oil pan. The protective shell at least partially encloses the outer wall of the oil pan and is held in a fixed position relative to the outer wall. The oil pan and the protective contour member are preferably made of a synthetic resin material. The protective contour member protects the oil pan against damage caused, for example, due to the impact of stones or if the oil pan comes into contact with an underlying uneven or sloped surface.

10 Claims, 2 Drawing Sheets

U.S. PATENT DOCUMENTS

| | | | |
|---|---|---|---|
| 2006/0169240 A1* | 8/2006 | Hanner et al. | 123/195 C |
| 2006/0201465 A1* | 9/2006 | Stone | 123/90.31 |
| 2006/0201470 A1* | 9/2006 | Vichinsky | 123/184.61 |

FOREIGN PATENT DOCUMENTS

| | | |
|---|---|---|
| DE | 197 39 778 A1 | 3/1998 |
| DE | 198 18 590 A1 | 11/1999 |
| DE | 101 19 937 A1 | 11/2002 |
| EP | 0 661 420 A1 | 7/1995 |
| EP | 0 872 632 A1 | 10/1998 |
| EP | 0 872 632 B1 | 10/1998 |
| EP | 1 041 253 B1 | 10/2000 |
| JP | 5-306653 A | 11/1993 |
| JP | 2004-278446 A | 10/2004 |

* cited by examiner

OIL PAN USEFUL FOR AN INTERNAL COMBUSTION ENGINE

BACKGROUND OF THE INVENTION

The invention relates to an oil pan, particularly for an internal combustion engine, having a protective contour member disposed on an outer wall thereof.

Oil pans for internal combustion engines, whose outer wall is provided with ribs for protecting the oil pan, particularly against strong mechanical impacts, e.g., caused by stones, are known in the art. An oil pan of this type is described, for example, in European patent application no. EP 1,041,253. The outside of the floor of the oil pan is provided with a plurality of spaced-apart ribs, a limited number of which have increased rigidity so that they are better able to absorb high mechanical forces.

The oil pan, which is located on the underside of the engine, must carry the full weight of the engine, particularly as the engine is mounted in the vehicle or when it is placed on the ground after having been removed for maintenance. The weight forces of the engine are supported by the ribs on the outside of the pan floor. This may cause problems if the engine is deposited at an angle, or if the ground is sloped or uneven, because some of the individual ribs are under substantially greater load than would be the case if the engine were placed evenly on the surface. In this case there is a risk that the ribs will break.

If a stone strikes the oil pan, damage to the pan cannot be ruled out despite the protective ribs because of the high momentum transmitted and the locally limited introduction of the force.

SUMMARY OF THE INVENTION

It is an object of the invention to provide an oil pan with improved protection against damage.

Another object of the invention is to provide an oil pan with damage protection using simple structural means.

A further object of the invention it to provide an oil pan with damage protection with little or no increase in weight.

These and other objects are achieved in accordance with the present invention by providing an oil pan having a protective contour member disposed around an outer wall thereof, in which the protective contour member comprises a protective shell which at least partly encloses the outer wall and is spaced apart from the outer wall and held in a fixed position in relation to the oil pan outer wall. Further advantageous refinements are described in more detail hereinafter.

The oil pan according to the invention has a protective shell which at least partly encloses the outer wall of the oil pan and is kept at a distance from the outer wall and in a fixed position relative thereto. The protective shell is a component manufactured separately from the outer wall but may be connected thereto and additionally protects the outer wall against mechanical damage. Because of the distance between the protective shell and the outer wall of the oil pan, it is ensured that any objects, such as stones, which penetrate or puncture the protective shell, for example, do not transmit the momentum directly to the outer wall and cannot damage the wall. Rather, the protective shell stops such objects before they can affect the wall.

The protective shell is advantageously held to the outer wall of the oil pan by means of spacer elements. These spacer elements ensure a uniform force distribution over the pan floor and the lateral walls. As a result, even point-like forces acting on the protective shell are uniformly distributed over a wide area across the outer wall of the oil pan via the spacer elements, so that the force peaks acting locally on the oil pan via the spacer elements are reduced.

The protective shell is preferably constructed as a closed wall without perforations. This has the advantage of offering an additional safeguard against oil leaks if the oil pan is damaged. If a leak were to occur in the outer wall of the oil pan, the escaping oil would be contained in the protective shell enclosing it. This reduces the risk of any contamination of the environment.

In the gap between the protective shell and the outer wall of the oil pan, a damping member is preferably inserted to dampen shocks and impacts which act on the protective shell from the outside. This damping member is preferably constructed as a separate component and is comprised of an elastomer, for example, which may be molded onto the protective shell or onto the outer wall of the oil pan in the form of an injection molded component. Other possible connecting methods include, for example, vulcanization or adhesive bonding.

The spacer elements, which on the one hand couple the protective shell to the oil pan and on the other hand hold the protective shell at a distance from the outer wall of the oil pan, may be configured, for example, as connecting ribs which, if the protective shell is an injection molded component, are preferably formed as an integral component of the protective shell. In an appropriate case, it is also within the scope of the invention to form the outer wall of the oil pan, the spacer elements and the protective shell as a one-piece construction. It is also possible to weld the spacer elements to the outer wall using vibration welding, ultrasonic welding or laser welding, for example, or to adhesively bond the spacer elements or mechanically fasten them to the outer wall, e.g., using screws, claws or clips. If the protective shell and the connecting elements are injection molded onto the outer wall, gas or water injection techniques may be used.

In accordance with another advantageous embodiment, the damping element inserted into the gap between the outer wall and the protective shell may be penetrated by the spacer elements coupling the protective shell to the outer wall of the oil pan. However, it is also possible, where appropriate, to provide spacer elements which do not directly connect the protective shell to the outer wall but merely protrude into the damping element. In this case, the protective shell is held to the oil pan via the damping element. Mixed forms, where the individual ribs protrude into the damping element without extending through it, and connecting elements coupling the protective shell directly to the outer wall of the oil pan are provided in addition, may also come into consideration.

The protective shell may form part of an underbody cover which is mounted to the underside of a motor vehicle for protection and to improve the drag coefficient. The protective shell forms part of this underbody cover and in the region of the oil pan is connected to the outer wall of the oil pan, either via the damping element or via the spacer elements, or possibly via both components.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
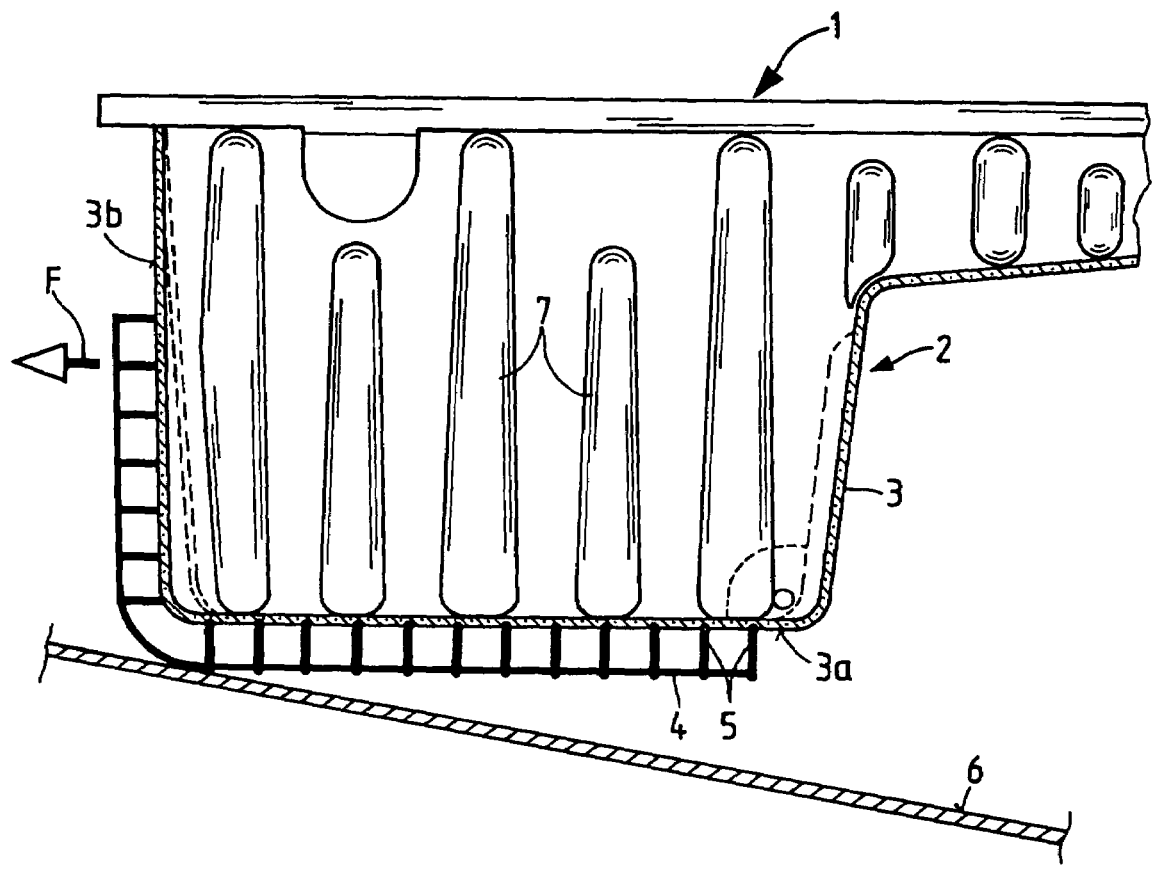
FIG. 1 is a side view of an oil pan for the internal combustion engine of a motor vehicle, in which the outer wall of the oil pan is enclosed by a protective shell, which is connected to the outer wall via a plurality of spacer elements, in the region of the pan floor and the sidewalls located in front as seen in the driving direction.

FIG. 1 shows an oil pan 1 for an internal combustion engine of a motor vehicle having an oil pan housing 2 made of a synthetic resin material (i.e., plastic). Preferably, the oil pan housing 2 is manufactured in an injection molding process. The outer wall 3 of the oil pan housing 2 comprises a pan floor 3a located at the bottom and circumferential sidewalls 3b. The pan floor 3a and the sidewalls 3b located toward the front of the vehicle in driving direction F are enclosed by a protective wall or shell 4, which is constructed as a separate component and is connected to the pan floor 3a and the front sidewall 3b by spacer elements 5. The spacer elements 5 ensure that the protective shell 4 is spaced apart from the outer wall 3 of the oil pan housing 2, such that a gap is formed between the outer wall 3 and the protective shell 4. The protective shell 4 is preferably also made of synthetic resin material, as are the spacer elements 5.

According to one preferred embodiment, the protective shell 4, including the spacer elements 5, is injection molded onto the outer wall 3 of the oil pan. The protective shell 4 is concentric relative to the outer wall 3 of the oil pan. The distance between the protective shell 4 and the outer wall 3 ensures that, if a stone hits or if the oil pan comes into uneven contact with an underlying uneven or sloped surface 6 as shown in FIG. 1, only the outer protective shell 4 is initially damaged, whereas the outer wall 3 of the oil pan remains sound. High forces acting on the protective shell 4 are uniformly distributed over the outer wall of the oil pan via the plurality of spacer elements 5, which are constructed as reinforcements or ribs, such that, to the extent that the oil pan is enclosed by the protective shell 4, high local force peaks acting on the protective shell 4 are uniformly distributed over the entire outer wall of the oil pan in the manner of a distributed load.

Additional ribs 7 may be formed along the outer wall 3 to reinforce the outer wall and provide greater stability. These ribs 7 are disposed directly on the outer wall 3, both in the region of the sidewalls 3b and preferably also in the region of the pan floor 3a.

Figure 2:
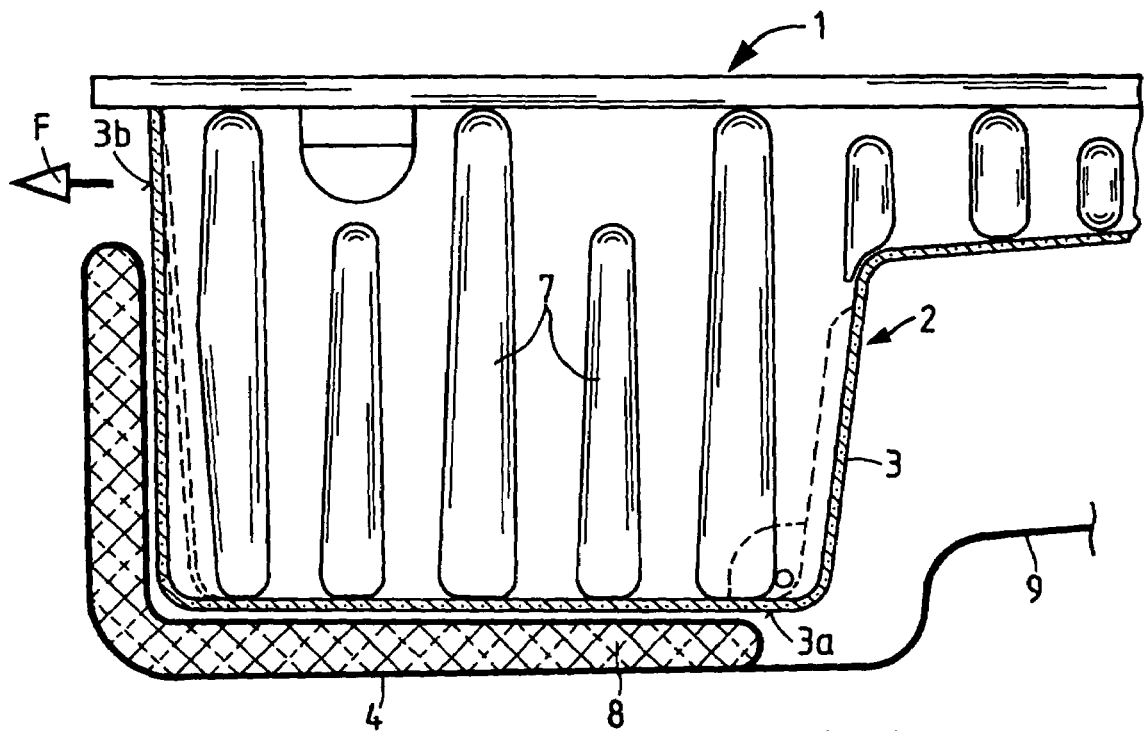
FIG. 2 is a view corresponding to that shown in FIG. 1, but with a protective shell that forms part of an underbody cover, including an elastomer damping element in the gap between the protective shell and the outer wall of the oil pan.

In the illustrative embodiment shown in FIG. 2, the protective shell 4 forms part of an underbody cover 9 provided on the underside of the motor vehicle. In the region lying in front as viewed in driving direction F, the protective shell 4 encloses the front sidewall 3b of the oil pan. The floor 3a of the outer wall 3 of the oil pan is also enclosed. The protective shell 4 is spaced apart from the outer wall 3, and a damping element 8 is inserted into the gap between the outer wall 3 and the protective shell 4. The damping element 8 is made, in particular, of an elastomer and is firmly connected to the protective shell 4. The underbody cover 9 attached to the vehicle, including the protective shell 4 forming the front region of the underbody cover, is preferably not connected directly to the oil pan 1 but attached to another component of the motor vehicle and, because of its inherent stability, is held in a fixed position relative to the outer wall 3 of the oil pan 1. The damping element 8 has preferably also no direct connection to the outer wall 3 of the oil pan.

In accordance with an alternative embodiment, it may be advantageous, however, to connect, e.g., bond, the damping element 8 to the outer wall 3. In addition, or as an alternative, it may be desirable to provide connecting elements for a further coupling of the protective shell 4 to the outer wall 3 of the oil pan 1.

Figure 3:
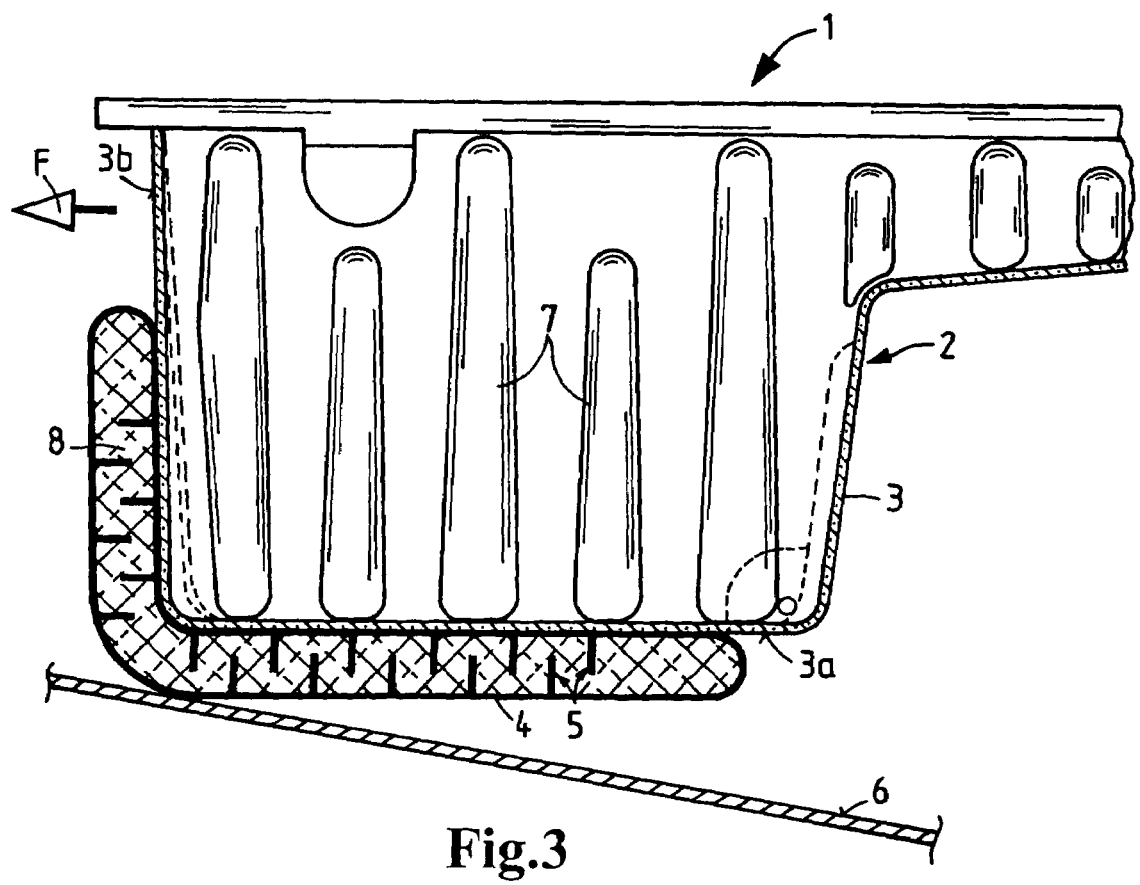
FIG. 3 is another illustrative embodiment of an oil pan according to the invention in which the protective shell is connected to the outer wall of the oil pan via the damping element, and in which, to provide stability, spacer elements protrude into the damping element but do not extend through it.

In the illustrative embodiment shown in FIG. 3, the protective shell 4 is configured as a separate stand-alone component, which is directly connected to the outer wall 3 of the oil pan 1. The protective shell 4 is coupled to the outer wall 3 via the elastomer damping element 8, which is disposed on the side of the protective shell 4 facing the oil pan 1. Spacer elements 5 may be provided in addition, but they do not fully bridge the distance between the protective shell 4 and the outer wall 3, as shown in FIG. 3, and thus do not extend all the way through the damping element 8 but only protrude into it. The spacer elements 5 are alternately disposed on the protective shell 4 and the pan floor 3a and the front sidewall 3b of the outer wall. In this embodiment, the protective shell 4 is coupled to the oil pan 1 exclusively via the damping element 8, which is preferably bonded to the outer wall 3 of the oil pan. The spacer elements 5, which do not extend all the way through the damping element 8, play a role only if a strong external impact is applied to the protective shell 4 in the direction of the oil pan 1, and the damping element 8 is compressed as a result, by absorbing the additional support forces as soon as the protective shell 4 has approached the outer wall to the point where the spacer elements 5 contact the opposite component.

It is also possible, if desired, to provide additional spacer elements that connect the protective shell 4 directly to the outer wall 3 of the oil pan.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An oil pan having a protective contour member disposed around an outer wall thereof, wherein the protective contour member comprises a protective shell which at least partly encloses the outer wall and is spaced apart from the outer wall and held in a fixed position in relation to the oil pan outer wall, wherein the protective shell is configured as a closed, continuous wall and encloses a bottom portion and a front side wall portion of the outer wall of the oil pan, and wherein said protective shell is an injection molded synthetic resin component.

2. An oil pan according to claim 1, wherein the protective shell is injection molded onto the outer wall of the oil pan.

3. An oil pan according to claim 1, wherein the protective shell is fastened to the outer wall of the oil pan by spacer elements.

4. An oil pan according to claim 1, further comprising a damping element interposed between the outer wall of the oil pan and the protective shell.

5. An oil pan according to claim 4, wherein the protective shell is spaced apart from the outer wall by spacer elements, and the spacer elements between the outer wall and the protective shell are configured as damping elements.

6. An oil pan according to claim 4, wherein the damping element is made as a separate component, which is inserted between the outer wall of the oil pan and the protective shell.

7. An oil pan according to claim 6, wherein the damping element is made of an elastomer.

8. An oil pan according to claim 6, wherein the protective shell is spaced apart from the outer wall by spacer elements, and the spacer elements protrude into the damping element but do not extend through it.

9. An oil pan according to claim 1, wherein said oil pan is affixed to an internal combustion engine.

10. A motor vehicle with an internal combustion engine and an oil pan according to claim 1, wherein the protective shell is part of an underbody cover.

* * * * *